US011961490B2

(12) United States Patent
Tian et al.

(10) Patent No.: US 11,961,490 B2
(45) Date of Patent: Apr. 16, 2024

(54) DRIVING CIRCUIT, DISPLAY PANEL AND DISPLAY DEVICE

(71) Applicant: WUHAN CHINA STAR OPTOELECTRONICS TECHNOLOGY CO., LTD., Hubei (CN)

(72) Inventors: Chao Tian, Hubei (CN); Yanqing Guan, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 683 days.

(21) Appl. No.: 16/971,483

(22) PCT Filed: Jul. 21, 2020

(86) PCT No.: PCT/CN2020/103155
§ 371 (c)(1),
(2) Date: Aug. 20, 2020

(87) PCT Pub. No.: WO2021/258460
PCT Pub. Date: Dec. 30, 2021

(65) Prior Publication Data

US 2022/0293062 A1 Sep. 15, 2022

(30) Foreign Application Priority Data

Jun. 23, 2020 (CN) ........................ 202010581181.7

(51) Int. Cl.
*G09G 3/36* (2006.01)

(52) U.S. Cl.
CPC ... *G09G 3/3677* (2013.01); *G09G 2310/0283* (2013.01); *G09G 2310/0289* (2013.01); *G09G 2310/08* (2013.01); *G09G 2320/0214* (2013.01)

(58) Field of Classification Search
None
See application file for complete search history.

(56) References Cited

U.S. PATENT DOCUMENTS

| | | | | |
|---|---|---|---|---|
| 10,714,044 | B1 * | 7/2020 | Zhang | G09G 3/3677 |
| 2017/0316732 | A1 | 11/2017 | Na | |
| 2019/0385555 | A1 * | 12/2019 | Guan | G11C 19/28 |
| 2020/0027516 | A1 * | 1/2020 | Feng | G09G 3/3291 |

(Continued)

FOREIGN PATENT DOCUMENTS

| | | | |
|---|---|---|---|
| CN | 108010496 | A | 5/2018 |
| CN | 108766380 | A | 11/2018 |

(Continued)

*Primary Examiner* — Andre L Matthews
(74) *Attorney, Agent, or Firm* — PV IP PC; Wei Te Chung; Zhigang Ma

(57) ABSTRACT

Disclosed is a driving circuit, a display panel and a display device. The driving circuit includes a plurality of cascaded driving units, where a first staged driving unit includes a forward and backward scan control module, a node signal control module, an output control module, a first voltage stabilizing module, a first pull-down module, a second pull-down module and an electrical leakage control module. The electrical leakage control module is configured to maintain a voltage level of an output signal of the forward and backward scan control module.

12 Claims, 3 Drawing Sheets

(56) References Cited

U.S. PATENT DOCUMENTS

| | | | | |
|---|---|---|---|---|
| 2020/0273418 | A1* | 8/2020 | Zhang | G09G 3/3677 |
| 2020/0320949 | A1* | 10/2020 | Li | G09G 3/3696 |
| 2021/0082344 | A1* | 3/2021 | Hwang | G09G 5/006 |
| 2021/0225311 | A1* | 7/2021 | Zhang | G11C 19/28 |
| 2021/0358381 | A1* | 11/2021 | Wang | G09G 3/3266 |

FOREIGN PATENT DOCUMENTS

| | | | |
|---|---|---|---|
| CN | 110782855 | A | 2/2020 |
| CN | 111312177 | A | 6/2020 |

* cited by examiner

DRIVING CIRCUIT, DISPLAY PANEL AND DISPLAY DEVICE

FIELD OF THE DISCLOSURE

The present application relates to display technologies, and more particularly to a driving circuit, a display panel and a display device.

DESCRIPTION OF RELATED ARTS

As a display component of electronic equipments, liquid crystal display devices have been widely used in various electronic products. A gate driver on array (GOA) circuit is an important part of the liquid crystal display device. GOA driving is a technology that manufactures a row-scan driving signal circuit on an array substrate using an existing array process for forming thin-film transistors of a liquid crystal display, to realize row-by-row scan driving (for the gates).

GOA driving circuits are classified into NMOS circuits, PMOS circuits and CMOS circuits. Compared to the CMOS circuits, the NMOS circuits are of great benefit in improving the product yield and reducing the cost for that masks used for P doping (PP) and related processes are eliminated, and therefore there is a realistic industrial demand to developing stable NMOS circuits.

An NMOS thin-film transistor (TFT) takes electrons as carriers. The mobility of the electrons is much high. However, the device is easier to be damaged than PMOS device (where holes serve as its carriers). The behavior of the device on a display panel product is lack of high temperature reliability. Currently, In-Cell touch panels (ITPs) usually need to insert several touch panel terms (TP terms) into a frame for realizing a touch control function. Meanwhile, NMOS GOA uses the capacitance of a Q point to maintain a high potential required for stage transmission. However, the thin-film transistor is not an ideal device, and will still have a certain amount of leakage current even in an off state. The longer the TP term lasts, the longer the time required to maintain the high potential for a pause stage of the touch panel. Accordingly, stability of GOA stage transmission is reduced. It is easy to cause a failure of GOA driving and a split of screen. The split of screen is more likely to occur at the TP pause stage especially for ITPs.

TECHNICAL PROBLEMS

Embodiments of the present application provide a driving circuit, a display panel and a display device, for improving stability of the driving circuit.

TECHNICAL SOLUTIONS

In a first aspect, the present application provides a driving circuit, including a plurality of cascaded driving units, where a first staged driving unit includes:

a forward and backward scan control module, configured to enable the driving circuit to perform forward scanning based on a forward scan control signal and enable the driving circuit to perform backward scanning based on a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end of the first staged driving unit based on a control signal provided by the node signal control module; and an electrical leakage control module, connected to the forward and backward scan control module, the first pull-down module and the second pull-down module, configured to maintain the voltage level of the output signal of the forward and backward scan control module.

In the driving circuit of the present application, the electrical leakage control module includes a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and the source of the third thin-film transistor is fed with the constant low voltage level signal.

In the driving circuit of the present application, the first staged driving unit further includes a third voltage stabilizing module, configured to maintain the voltage level of a third node, the third voltage stabilizing module includes a first capacitor, one end of the first capacitor is connected to the third node, and the other end of the first capacitor is connected to the first staged gate driving signal.

In the driving circuit of the present application, the forward and backward scan control module includes a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, and wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit.

In the driving circuit of the present application, the node signal control module includes a sixth thin-film transistor, a seventh thin-film transistor and an eleventh thin-film transistor, wherein the gate of the sixth thin-film transistor is connected to the source of the fourth thin-film transistor, the source of the sixth thin-film transistor is fed with a second staged clock signal, the drain of the sixth thin-film transistor is connected to the drain of the seventh thin-film transistor and the gate of the eleventh thin-film transistor, wherein the gate of the seventh thin-film transistor is connected to the source of the fifth thin-film transistor, the source of the seventh thin-film transistor is fed with a third staged clock signal, and wherein the source of the eleventh thin-film transistor is fed with a constant high voltage level signal and the drain of the eleventh thin-film transistor is connected to the second node.

In the driving circuit of the present application, the first pull-down module includes a ninth thin-film transistor, the gate of the ninth thin-film transistor is connected to the drain of the fifth thin-film transistor, the source of the ninth thin-film transistor is fed with a constant low voltage level signal, and the drain of the ninth thin-film transistor is connected to the second node.

In the driving circuit of the present application, the first voltage stabilizing module includes a tenth thin-film transistor, a gate of the tenth thin-film transistor is fed with a constant high voltage level signal, and a source of the tenth thin-film transistor is connected to the first node.

In the driving circuit of the present application, the output control module includes a twelfth thin-film transistor, the gate of the twelfth thin-film transistor is connected to a drain of the tenth thin-film transistor, and the source of the twelfth thin-film transistor is fed with a first staged clock signal.

A display panel includes the driving circuit, in which the driving unit includes a plurality of cascaded driving units, where a first staged driving unit includes:

a forward and backward scan control module, configured to enable the driving circuit to perform forward scanning or backward scanning based on a forward scan control signal or a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end of the first staged driving unit based on a control signal provided by the node signal control module; and an electrical leakage control module, connected to the forward and backward scan control module, the first pull-down module and the second pull-down module, configured to maintain the voltage level of the output signal of the forward and backward scan control module.

In the display panel of the present application, the electrical leakage control module includes a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and the source of the third thin-film transistor is fed with the constant low voltage level signal.

In the display panel of the present application, the first staged driving unit further includes a third voltage stabilizing module, configured to maintain the voltage level of a third node, the third voltage stabilizing module includes a first capacitor, one end of the first capacitor is connected to the third node, and the other end of the first capacitor is connected to the first staged gate driving signal.

In the display panel of the present application, the forward and backward scan control module includes a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, and wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit.

In the display panel of the present application, the node signal control module includes a sixth thin-film transistor, a seventh thin-film transistor and an eleventh thin-film transistor, wherein the gate of the sixth thin-film transistor is connected to the source of the fourth thin-film transistor, the source of the sixth thin-film transistor is fed with a second staged clock signal, the drain of the sixth thin-film transistor is connected to the drain of the seventh thin-film transistor and the gate of the eleventh thin-film transistor, wherein the gate of the seventh thin-film transistor is connected to the source of the fifth thin-film transistor, the source of the seventh thin-film transistor is fed with a third staged clock signal, and wherein the source of the eleventh thin-film transistor is fed with a constant high voltage level signal and the drain of the eleventh thin-film transistor is connected to the second node.

In the display panel of the present application, the first pull-down module includes a ninth thin-film transistor, the gate of the ninth thin-film transistor is connected to the drain of the fifth thin-film transistor, the source of the ninth thin-film transistor is fed with a constant low voltage level signal, and the drain of the ninth thin-film transistor is connected to the second node.

In the display panel of the present application, the first voltage stabilizing module includes a tenth thin-film transistor, a gate of the tenth thin-film transistor is fed with a constant high voltage level signal, and a source of the tenth thin-film transistor is connected to the first node.

In the display panel of the present application, the output control module includes a twelfth thin-film transistor, the gate of the twelfth thin-film transistor is connected to a drain of the tenth thin-film transistor, and the source of the twelfth thin-film transistor is fed with a first staged clock signal.

A display device, in which the display panel includes a driving circuit and the driving unit includes a plurality of cascaded driving units, where a first staged driving unit includes:

a forward and backward scan control module, configured to enable the driving circuit to perform forward scanning or backward scanning based on a forward scan control signal or a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end based on a control signal provided by the node signal control module; and an electrical leakage control module, connected to the forward and backward scan control module, the first pull-down module and the second pull-down module, configured to maintain the voltage level of the output signal of the forward and backward scan control module.

In the display device of the present application, the electrical leakage control module includes a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and source of the third thin-film transistor is fed with the constant low voltage level signal.

In the display device of the present application, the first staged driving unit further includes a third voltage stabilizing module, configured to maintain the voltage level of a third node, the third voltage stabilizing module includes a first capacitor, one end of the first capacitor is connected to the third node, and the other end of the first capacitor is connected to the first staged gate driving signal.

In the display device of the present application, the forward and backward scan control module includes a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, and wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit.

BENEFICIAL EFFECTS

In comparison to the existing arts, the electrical leakage control module is added in the driving unit, the display panel and the display device of the present application. The first node is kept at a high voltage level during cascaded signal transmission at various stages of driving units, and meanwhile a high voltage level signal is transmitted, at the first node, to the electrical leakage control module. Since the voltage of the electrical leakage control module is also in a high-voltage-level state, a leakage current will not occur at the first node. Therefore, stability of the first node can be improved as well as stability of the driving circuit.

DESCRIPTION OF EMBODIMENTS OF THE DISCLOSURE

The present application provides a driving circuit, a display panel and a display device. To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

The driving circuit provided in an embodiment of the present embodiment is illustrated by a gate on array (GOA) driving circuit.

Figure 1:
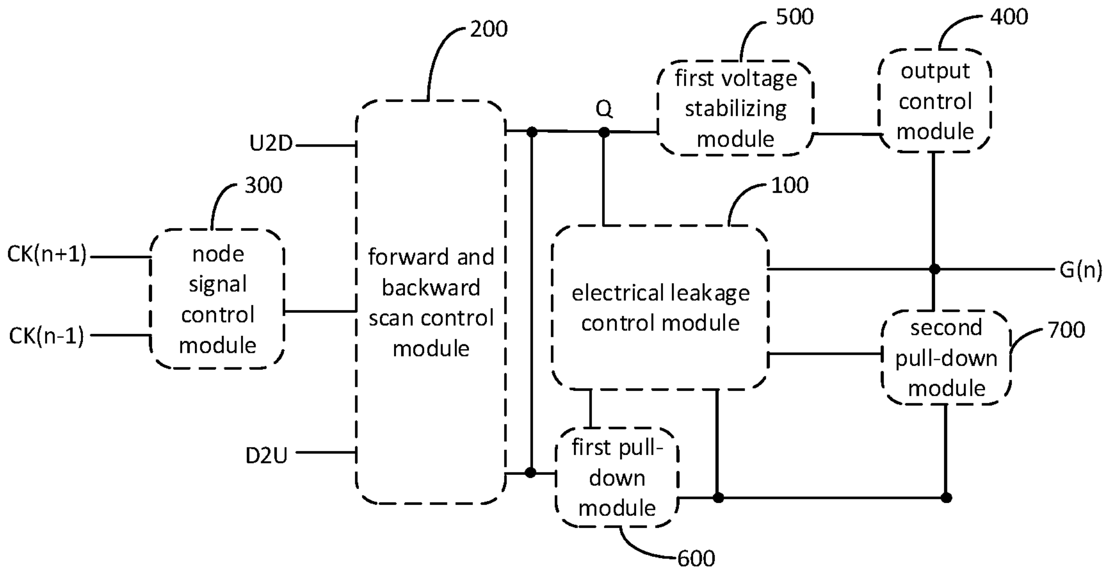
FIG. 1 is a schematic diagram illustrating connections between modules of a n-th staged GOA driving unit in an embodiment of the present application.

An embodiment of the present application provides a GOA driving circuit. The GOA driving circuit includes a plurality of cascaded GOA driving unit. Specifically, please refer to FIG. 1, which is a schematic diagram illustrating connections between various modules in a driving unit according to the present application. each stage of the plurality of cascaded GOA driving units includes an electrical leakage control module 100, a forward and backward scan control module 200, a node signal control module 300, an output control module 400, a first voltage stabilizing module 500, a first pull-down module 600 and a second pull-down module 700.

The forward and backward scan control module 200 is configured to enable the driving circuit to perform forward scanning based on a forward scan control signal and enable the driving circuit to perform backward scanning based on a backward scan control signal.

The node signal control module 300 is configured to enable the driving circuit to output a gate driving signal at an abnormal stage based on a clock signal of a second staged driving unit and the clock signal of a third staged driving unit. A voltage level of the gate driving signal is less than a predetermined voltage level, that is, a low-voltage-level gate driving signal is outputted. The second staged driving unit is a driving unit of a preceding stage with respect to the first staged driving unit and the third staged driving unit is a driving unit of a next stage with respect to the first staged driving unit.

An output control module 400 is located between a first node Q and an output end of the first staged driving unit and is configured to control outputting a first staged gate driving signal during the forward scanning or the backward scanning performed by the driving circuit, wherein the first node is a node of the output end of the forward and backward scan control module.

The first voltage stabilizing module 500 is connected to the forward and backward scan control module 200 and the output control module 400 and is configured to maintain the voltage level of an output signal of the forward and backward scan control module 200.

The first pull-down module 600 is configured to pull down the voltage level of a second node P.

The second pull-down module 700 is configured to pull down a voltage at the first node Q and the voltage at the output end of the first staged driving unit based on a control signal provided by the node signal control module 300.

The electrical leakage control module 100 is connected to the forward and backward scan control module 200, the first pull-down module 600 and the second pull-down module 700, and is configured to maintain the voltage level of the output signal of the forward and backward scan control module.

In comparison to the existing arts, the electrical leakage control module is added in the driving unit, the display panel and the display device of the present application. The first node is kept at a high voltage level during cascaded signal transmission at various stages of driving units or activation of a touch display panel, and meanwhile a high voltage level signal is transmitted, at the first node, to the electrical leakage control module. Since the voltage of the electrical leakage control module is also in a high-voltage-level state, a leakage current will not occur at the first node. Therefore, stability of the first node can be improved as well as stability of the driving circuit.

In the GOA driving circuit of the embodiment of the present application, each stage of the plurality of cascaded GOA driving units has a same structure of GOA driving unit. For example, a GOA circuit of the application includes m cascaded GOA driving units, that is, a first staged driving unit, a second staged driving unit, . . . , an (n−1)-th staged driving unit, an n-th staged driving unit, an (n+1)-th staged driving unit, . . . , an m-th staged driving unit, where $m \geqslant n \geqslant 1$. The GOA driving circuit of the embodiment of the present application includes the aforesaid m GOA driving units.

Figure 2:
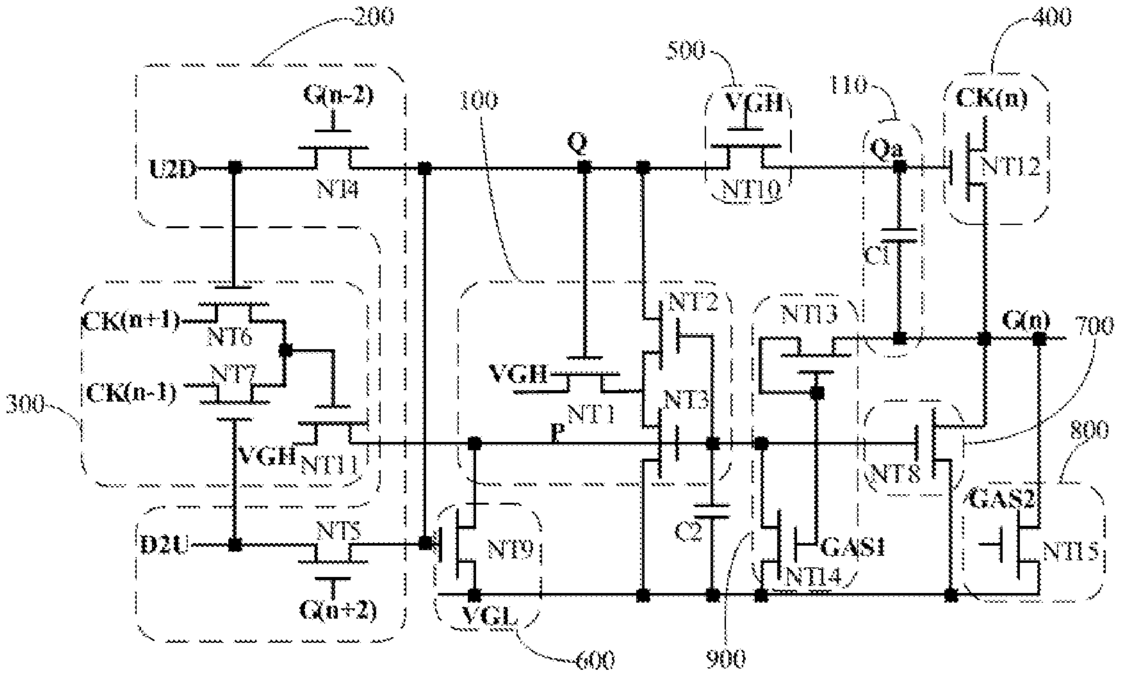
FIG. 2 is a schematic diagram illustrating a GOA driving circuit provided in an embodiment of the present application.

For example, the output end of an n-th GOA circuit unit is connected to the input end of a next ((n+1)-th) GOA circuit unit and the input end of the n-th GOA circuit unit is connected to the output end of a preceding ((n−1)-th) GOA circuit unit, where n is a natural number not less than 1. As shown in FIG. 2, the structure of the driving unit is illustrated by an n-th staged driving unit. The electrical leakage control module 100 includes a first thin-film transistor NT1, a second thin-film transistor NT2 and a third thin-film transistor NT3. The gate of the first thin-film transistor NT1 is connected to the first node Q, the source of the first thin-film transistor NT1 is fed with a constant high voltage level signal and the drain of the first thin-film transistor NT1 is connected to the drain of the second thin-film transistor NT2 and the drain of the third thin-film transistor NT3. The gate of the second thin-film transistor NT2 is fed with a constant low voltage level signal, the source of the second thin-film transistor NT2 is connected to the first node Q, the gate of the third thin-film transistor NT3 is connected to the second node P, and the source of the third thin-film transistor NT3 is fed with the constant low voltage level signal VGL.

The forward and backward scan control module 200 is configured to enable the GOA driving circuit to perform forward scanning or backward scanning based on a forward scan control signal U2D or a backward scan control signal D2U. The forward and backward scan control module 200 includes a fourth thin-film transistor NT4 and a fifth thin-film transistor NT5. The source of the fourth thin-film transistor NT4 is fed with the forward scan control signal, and the gate of the fourth thin-film transistor NT4 is connected to the gate driving signal of an (n−2)-th staged GOA driving unit. The drain of the fourth thin-film transistor NT4 is connected to the drain of the fifth thin-film transistor NT5, the first pull-down module 600 and the first node. The source of the fifth thin-film transistor NT5 is fed with the backward scan control signal, and the gate of the fifth thin-film transistor NT5 is connected to the gate driving signal of an (n+2)-th staged GOA driving unit.

The node signal control module 300 is configured to enable the GOA unit of a current stage (i.e., the n-th staged GOA unit) to output a low-voltage-level gate driving signal at an abnormal stage based on an (n+1)-th staged clock signal CK(n+1) and an (n−1)-th staged clock signal CK(n−1), in which the abnormal stage can be an operational stage that sudden power loss is encountered or that an abnormal black screen occurs.

The node signal control module 300 includes a sixteenth transistor NT6, a seventh thin-film transistor NT7 and an eleventh thin-film transistor NT11. The gate of the sixth thin-film transistor NT6 is connected to the source of the third thin-film transistor NT3, the source of the sixth thin-film transistor NT6 is fed with an (n+1)-th staged clock signal, and the drain of the sixth thin-film transistor NT6 is connected to the drain of the seventh thin-film transistor NT7 and the gate of the eleventh thin-film transistor NT11. The gate of the seventh thin-film transistor NT7 is connected to the source of the fifth thin-film transistor NT5 and the source of the seventh thin-film transistor NT7 is fed with an (n−1)-th staged clock signal. The source of the eleventh thin-film transistor NT11 is fed with the constant high voltage level signal and the drain of the eleventh thin-film transistor NT11 is connected to the second node P.

The output control module 400 is configured to control outputting the gate driving signal of the current stage (the n-th stage) based on the clock signal of the current stage (the n-th stage). The output control module 400 includes a twelfth thin-film transistor NT12, the gate of the twelfth thin-film transistor NT12 is connected to the drain of the tenth thin-film transistor NT10, and the source of the twelfth thin-film transistor NT12 is fed with the clock signal of the current stage (the n-th stage).

The first voltage stabilizing module 500 is configured to maintain the voltage level of the first node Q. The first voltage stabilizing module 500 includes a ninth thin-film transistor NT10, the gate of the tenth thin-film transistor NT10 is fed with the constant high voltage level signal, and the source of the ninth thin-film transistor NT9 is connected to the first node Q. The first pull-down module 600 is configured to pull down the voltage level of the second node P. The first pull-down module 600 includes a ninth thin-film transistor NT9, the gate of the ninth thin-film transistor NT9 is connected to the drain of the fifth thin-film transistor NTS, the source of the ninth thin-film transistor NT9 is fed with the constant low voltage level signal, and the drain of the ninth thin-film transistor NT9 is connected to the second node P.

The second pull-down module 700 is configured to pull down the voltage level of the gate driving signal G(n) of the current stage (the n-th stage). The second pull-down module 700 includes an eighth thin-film transistor NT8, the gate of the eighth thin-film transistor NT8 is connected to the second node P and the drain of the eleventh thin-film transistor NT11, the source of the eighth thin-film transistor NT8 is fed with the constant low voltage level signal VGL, and the drain of the eighth thin-film transistor NT8 is connected to the gate driving signal G(n) of the current stage (the n-th stage).

The GOA driving unit may further include a third pull-down module 800, a pull-up module 900 and a second capacitor C2.

The third pull-down module 800 includes a fifteenth thin-film transistor NT15, the gate of the fifteenth thin-film transistor NT15 is connected to a second global signal GAS2, the source of the fifteenth thin-film transistor NT15 is connected to the constant low voltage level signal VGL, and the drain of the fifteenth thin-film transistor NT15 is connected to the gate driving signal G(n) of the current stage. The third pull-down module 800 is configured to pull down the voltage level of the gate driving signal G(n) of the current stage (the n-th stage) based on the second global signal GAS2 when the display panel is in a second operation state.

The pull-up module 900 includes a thirteenth thin-film transistor NT13 and a fourteenth thin-film transistor NT14. Both the drain and the gate of the thirteenth thin-film transistor NT13 are connected to a first global signal Gas1, and the source of the thirteenth thin-film transistor NT13 is connected to the gate driving signal G(n) of the current stage. The gate of the fourteenth thin-film transistor NT14 is connected to the first global signal Gas1, the source of the fourteenth thin-film transistor NT14 is connected to the constant low voltage level signal VGL, and the drain of the fourteenth thin-film transistor NT14 is connected to the gate of the eleventh thin-film transistor NT11. The pull-up module 900 is configured to enable the GOA unit of the current stage (the n-th stage) to output a high-voltage-level gate driving signal based on the first global signal GAS1 when the display panel is in a first operation state. The first operation state is an operation state that a black screen occurs in touch control or that abnormal power loss is encountered. It can be understood that the first global signal GAS1 is at high voltage level and all of the GOA units output the high-voltage-level gate driving signal when the display panel is in the first operation state. The second operation state is directed to a time period the displaying and touch control function, and at that time the second global signal GAS2 is at high voltage level.

In some embodiments, one end of the second capacitor C2 is connected to the second node P and the other end of the second capacitor C2 is fed with the constant low voltage level signal VGL.

When the display panel is in a forward scanning state, U2D is high voltage level and D2U is low voltage level. Meanwhile, GOA driving is achieved line by line from top to bottom. Conversely, when the display panel is in a backward scanning state, U2D is low voltage level and D2U is high voltage level. Meanwhile, GOA driving is achieved line by line from bottom to top.

Figure 3:
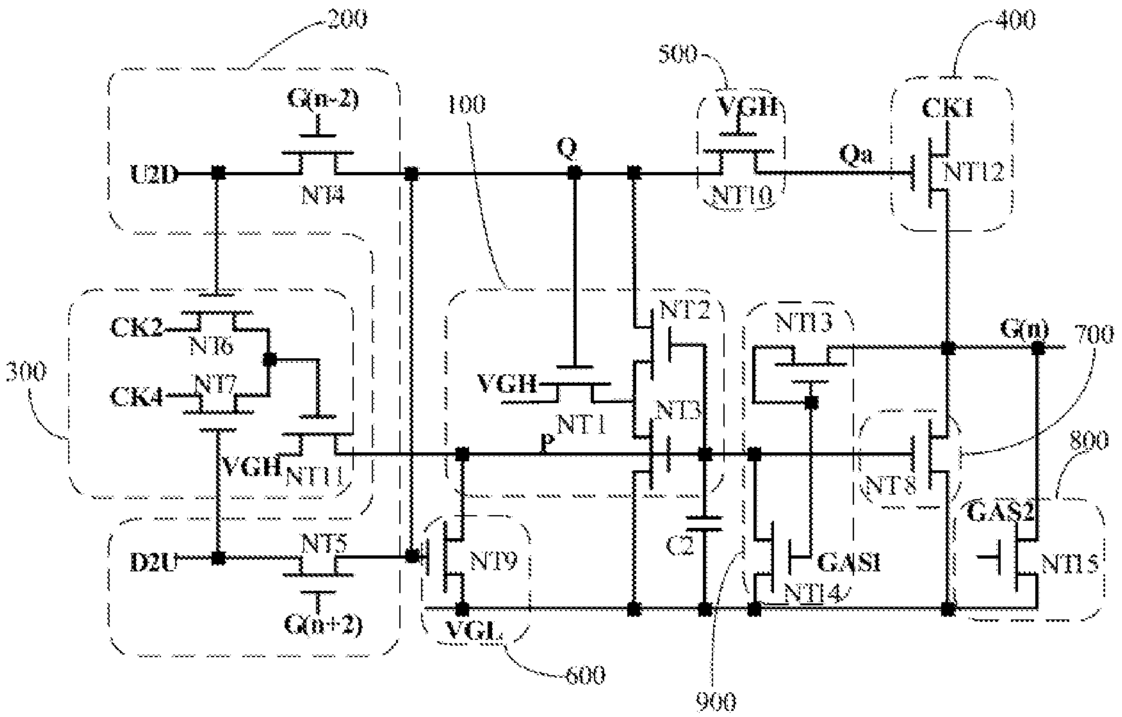
FIG. 3 is a schematic diagram illustrating a n-th staged GOA unit of a GOA driving circuit in an embodiment of the present application.
Figure 4:
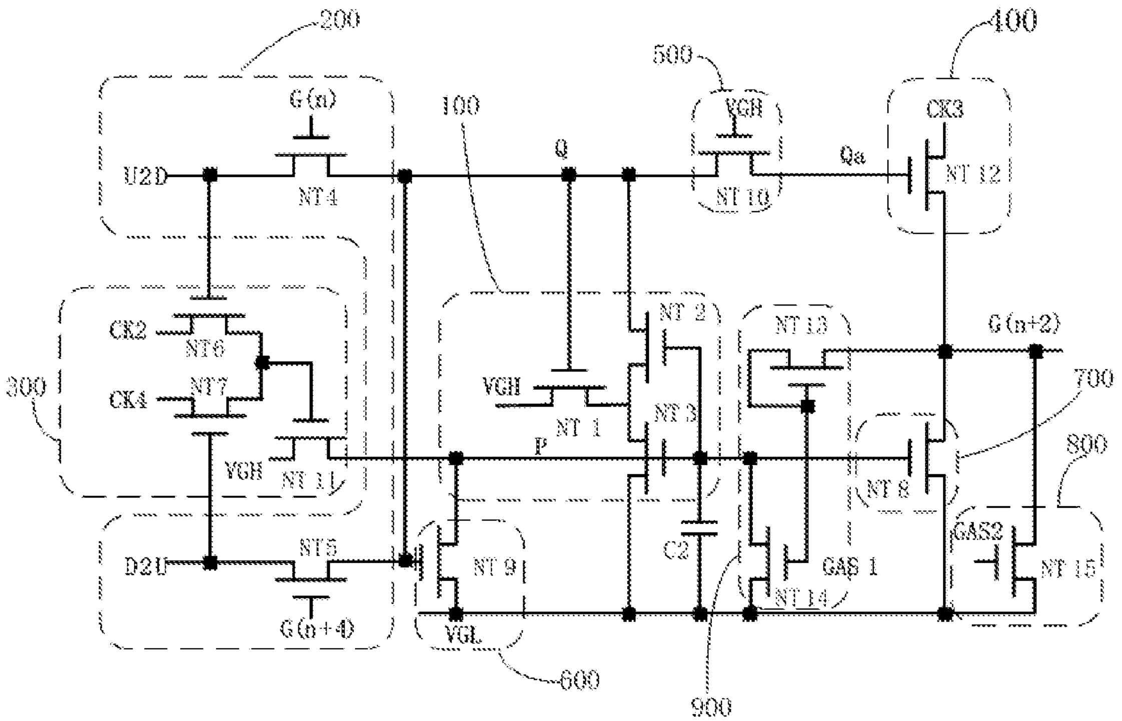
FIG. 4 is a schematic diagram illustrating a (n+2)-th staged GOA unit of a GOA driving circuit in an embodiment of the present application.
Figure 5:
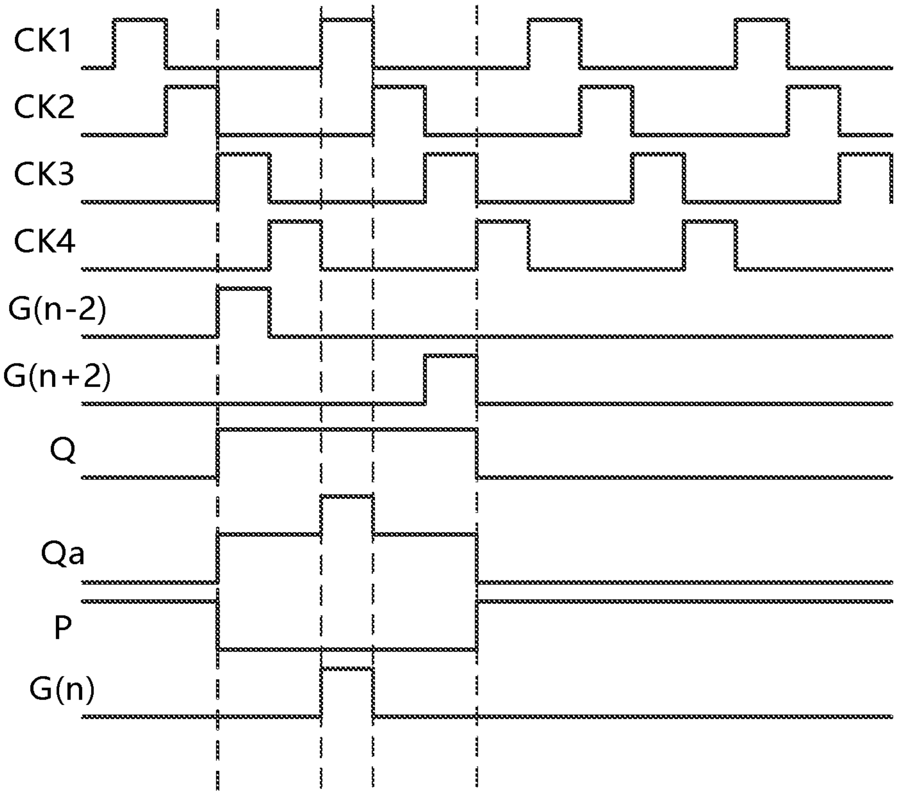
FIG. 5 is diagram illustrating the timing of a GOA driving circuit of a display panel of a 4CK architecture in an embodiment of the present application.

There are a left-side GOA circuit and a right-side GOA circuit provided at two sides of the display panel, respectively. In an embodiment, the left-side GOA circuit drives odd rows of scan lines and the right-side GOA circuit drives even rows of scan lines. When the display panel belongs to a 4CK architecture, two basic units are taken as a minimum repeating unit that is repeatedly used in the GOA circuit. As shown in FIGS. 3 and 4, an n-th staged GOA unit and an (n+2)-th staged GOA unit may together make up a GOA repeating unit. FIG. 5 is diagram illustrating the timing of a corresponding GOA circuit of a display panel of a 4CK architecture. The GOA circuit has four clock signals CK in total, that is, a first clock signal CK1 to a fourth clock signal CK4. When an n-th staged clock signal of an n-th staged GOA unit is the first clock signal CK1, an (n+1)-th staged clock signal of the n-th staged GOA unit is the second clock signal CK2 and an (n−1)-th staged clock signal of the n-th staged GOA unit is the fourth clock signal CK4. When an n-th staged clock signal of an (n+2)-th staged GOA unit is the third clock signal CK3, an (n+1)-th staged clock signal of the (n+2)-th staged GOA unit is the fourth clock signal CK4 and an (n−1)-th staged clock signal of the (n+2)-th staged GOA unit is the second clock signal CK2. Referring to FIG. 5 with reference to FIG. 3, if the node signal control module 300 of the n-th staged GOA unit is fed with the second and the fourth clock signals and the output control module 400 is fed with the first clock signal, then the node signal control module of the (n+1)-th staged GOA unit is fed with the first and the third clock signals and the output control module 400 of the (n+1)-th staged GOA unit is fed with the second clock signal. As show in FIG. 4, if the node signal control module 300 of the n-th staged GOA unit is fed with the second and the fourth clock signals and the output control module 400 is fed with the third clock signal, then the node signal control module 300 of the (n+1)-th staged GOA unit is fed with the second and the fourth clock signals and the output control module 400 of the (n+1)-th staged GOA unit is fed with the fourth clock signal.

Duty ratio of the four CK signals can be 50% or 25%. The duty ratio adopted in FIG. 5 is 25%. Of course, the display panel may also utilize an 8CK architecture, where four basic units are taken as a minimum repeating unit that is repeatedly used in the GOA circuit.

In addition, both the first global signal GAS1 and the second global signal GAS2 are at low voltage level when the display panel operates normally. The second global signal GAS2 is changed from low voltage to high voltage level when turned from a display period T1 to a touch control period T2.

Referring back to FIG. 2, VGL and D2U have a same voltage in normal conditions. On a reloaded screen (such as a picture obtained after point inversion), a display region is connected with VGL signal via NT10, and VGL is greatly affected by coupling with the display region Compared to D2U signal, VGL has a larger fluctuation. Although VGL and D2U have a same voltage, an instant voltage of VGL affected by the coupling is higher than that of D2U. In a case that G(N+2) signal is not pulled down, the gate of the third thin-film transistor NT3 of the GOA unit of a next stage is fed with G(N+2) and this results in a risk that the third thin-film transistor NT3 is instantly switched on. If the third thin-film transistor NT3 is switched on and Point Q is at high potential level at the time, there is a risk for the potential of Point Q to be released (pulled down) and thus the Point Q cannot be kept at high potential. Therefore, a normal stage transmission function cannot be realized and this may cause malfunction of the GOA circuit.

Compared to the existing arts, the embodiment of the present application adds the electrical leakage control module 100 to add the first thin-film transistor NT1 and the second third thin-film transistor NT2, modifies an original electric leakage path of Point Q to VGL via the third thin-film transistor NT3 as an electric leakage path of VGH to VGL via the first thin-film transistor NT1 and the third thin-film transistor NT3, and reduces the occurrence of an electric leakage path of Point Q to VGL via the second thin-film transistor NT2 and the third thin-film transistor NT3. During stage transmission and touch screen (TP) are activated, Point Q is at high potential and at the time, the first thin-film transistor NT1 is switched on to transmit VGH to the first thin-film transistor NT1, the second thin-film transistor NT2 and the third thin-film transistor NT3. Meanwhile, since both the voltages of the source and the drain of the second thin-film transistor NT2 are VGH, Point Q will not have an electric leakage to VGL via the third thin-film transistor NT3, thereby ensuring voltage stability of Point Q. Adding the electrical leakage control module 100 can reduce possible electric leakage paths of Point Q and improve stability of stage transmission of the GOA driving circuit without an increase of the number of signal lines and a change of the timing as compared to conventional circuit structures.

Figure 6:
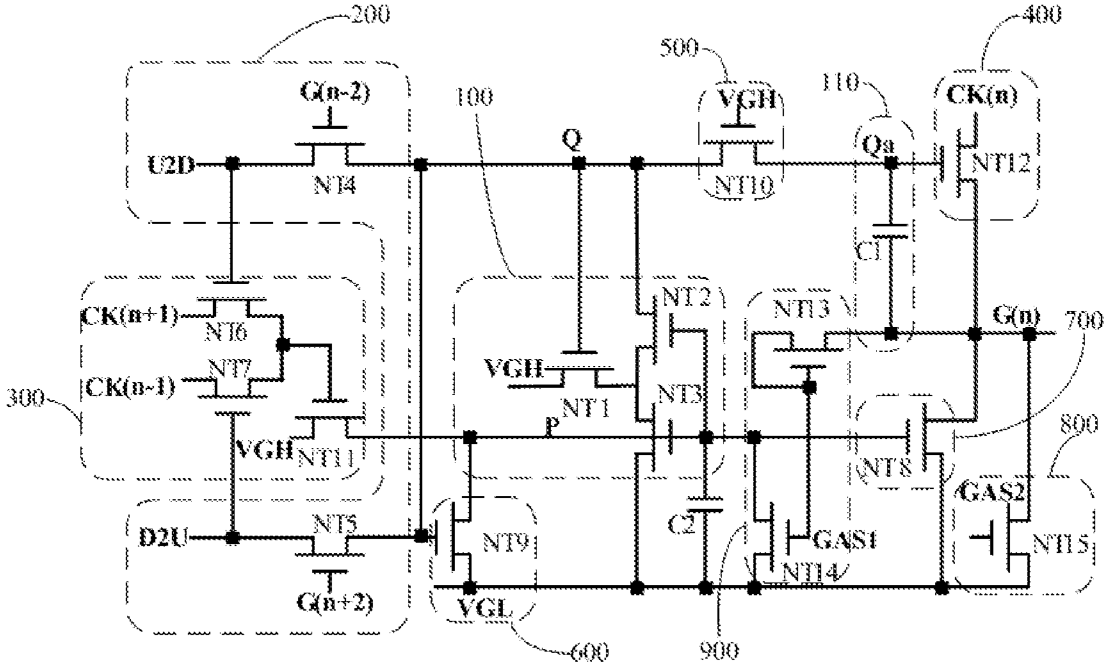
FIG. 6 is a schematic diagram illustrating a GOA driving circuit provided in another embodiment of the present application.

The present application further provides an embodiment. Please refer to FIG. 6, which is a diagram illustrating a GOA circuit according to another embodiment of the present application. On a basis of the preceding embodiment, a third voltage stabilizing module 110 is added in the present embodiment. The structure and function of other modules of the present embodiment are as the same as the preceding embodiment, and are not repeated herein. The third voltage stabilizing module 110 is configured to maintain the voltage level of the third node Qa. The third voltage stabilizing module 110 includes a first capacitor C1, one end of the first capacitor C1 is connected to the third node Qa, and the other end of the first capacitor C1 is connected to the gate driving signal of the current stage (the n-th stage). It is beneficial to improve the potential of Point Qa and the output of the gate driving signal G(n) of the current stage (the n-th stage).

To better realize the GOA driving circuit in the embodiment of the present application, an embodiment of the present application further provides a display panel on a basis of the GOA driving circuit. The GOA driving circuit is integrated into the display panel. The GOA driving circuit is configured to drive the display panel. The GOA driving circuit includes plurality of cascaded driving units. Each stage of the plurality of cascaded GOA driving units includes an electrical leakage control module 100, a forward and backward scan control module 200, a node signal control module 300, an output control module 400, a first voltage stabilizing module 500, a first pull-down module 600 and a second pull-down module 700.

The forward and backward scan control module 200 is configured to enable the driving circuit to perform forward scanning based on a forward scan control signal and enable the driving circuit to perform backward scanning based on a backward scan control signal.

The node signal control module 300 is configured to enable the driving circuit to output a gate driving signal at an abnormal stage based on a clock signal of a second staged driving unit and the clock signal of a third staged driving unit. A voltage level of the gate driving signal is less than a predetermined voltage level, that is, a low-voltage-level gate driving signal is outputted. The second staged driving unit is a driving unit of a preceding stage with respect to the first staged driving unit and the third staged driving unit is a driving unit of a next stage with respect to the first staged driving unit.

An output control module 400 is located between a first node Q and an output end of the first staged driving unit and is configured to control outputting a first staged gate driving signal during the forward scanning or the backward scanning performed by the driving circuit, wherein the first node is a node of the output end of the forward and backward scan control module.

The first voltage stabilizing module 500 is connected to the forward and backward scan control module and the output control module and is configured to maintain the voltage level of an output signal of the forward and backward scan control module.

The first pull-down module 600 is configured to pull down the voltage level of a second node P.

The second pull-down module 700 is configured to pull down a voltage at the first node Q and the voltage at the output end of the first staged driving unit based on a control signal provided by the node signal control module 300.

The electrical leakage control module 100 is connected to the forward and backward scan control module 200, the first pull-down module 600 and the second pull-down module 700, and is configured to maintain the voltage level of the output signal of the forward and backward scan control module.

The electrical leakage control module 100 is connected to the forward and backward scan control module 300, the first pull-down module 600 and the second pull-down module 700, and is configured to maintain the voltage level of the output signal of the forward and backward scan control module 200.

The display panel provided in the embodiment of the present application includes the GOA circuit and the electrical leakage control module is added in the GOA driving circuit. Point Q is kept at a high voltage level during cascaded signal transmission at various stages of driving units and while a touch display panel is used, and meanwhile Point Q outputs a high voltage level signal to the electrical leakage control module. Since the voltage of the electrical leakage control module is also in a high-voltage-level state, a leakage current will not occur at Point Q. Therefore, stability of Pint Q can be improved as well as stability of stage transmission of the driving circuit, thereby improving stability of the display panel.

An embodiment of the present application further provides a display device. The display panel is integrated into the display device. The display device displays images by use of the display panel. The display panel includes the GOA circuit, and the driving circuit includes the followings.

The GOA driving circuit includes a plurality of cascaded driving units, where a first staged driving unit includes:

a forward and backward scan control module, configured to enable the driving circuit to perform forward scanning or backward scanning based on a forward scan control signal or a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end based on a control signal provided by the node signal control module; and an electrical leakage control module, connected to the forward and backward scan control module, the first pull-down module and the second pull-down module, configured to maintain the voltage level of the output signal of the forward and backward scan control module.

The electrical leakage control module is added in the GOA driving circuit of the display device in the embodiment of the present application. Point Q is kept at a high voltage level during cascaded signal transmission at various stages of driving units and while a touch display panel is used, and meanwhile Point Q outputs a high voltage level signal to the electrical leakage control module. Since the voltage of the electrical leakage control module is also in a high-voltage-level state, a leakage current will not occur at Point Q. Therefore, stability of Pint Q can be improved as well as stability of stage transmission of the driving circuit, thereby improving stability of the display panel.

It should be noted that the display device may include, but not limited to, a cell phone, a tablet computer, a notebook, a television, a mobile Internet device (MID) and a personal digital assistant (PDA) equipped with the afore-described display panel.

In above embodiments, different emphasis is placed on respective embodiments, and reference may be made to related depictions in other embodiments for portions not detailed in a certain embodiment and is not repeated herein.

During specific implementation, the foregoing units or structures may be implemented as independent entities, or may be implemented as one or more entities through random combination. For specific implementation of the foregoing units or structures, refer to the above method embodiments, and details are not described herein again.

Hereinbefore, the GOA driving circuit, the display panel and the display device provided in the embodiments of the present application are introduced in detail, the principles and implementations of the present application are set forth herein with reference to specific examples, descriptions of the above embodiments are merely served to assist in understanding the technical solutions and essential ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. A driving circuit, comprising a plurality of cascaded driving units, where a first staged driving unit comprises:

a forward and backward scan control module, configured to enable the driving circuit to perform forward scanning based on a forward scan control signal and enable the driving circuit to perform backward scanning based on a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end of the first staged driving unit based on a control signal provided by the node signal control module; and an electrical leakage control module, connected to the forward and backward scan control module, the first pull-down module and the second pull-down module, configured to maintain the voltage level of the output signal of the forward and backward scan control module, wherein the forward and backward scan control module comprises a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit, wherein the node signal control module comprises a sixth thin-film transistor, a seventh thin-film transistor and an eleventh thin-film transistor, wherein the gate of the sixth thin-film transistor is connected to the source of the fourth thin-film transistor, the source of the sixth thin-film transistor is fed with a second staged clock signal, the drain of the sixth thin-film transistor is connected to the drain of the seventh thin-film transistor and the gate of the eleventh thin-film transistor, wherein the gate of the seventh thin-film transistor is connected to the source of the fifth thin-film transistor, the source of the seventh thin-film transistor is fed with a third staged clock signal, and wherein the source of the eleventh thin-film transistor is fed with a constant high voltage level signal and the drain of the eleventh thin-film transistor is connected to the second node.

2. The driving circuit according to claim 1, wherein the electrical leakage control module comprises a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and the source of the third thin-film transistor is fed with the constant low voltage level signal.

3. The driving circuit according to claim 1, wherein the first pull-down module comprises a ninth thin-film transistor, the gate of the ninth thin-film transistor is connected to the drain of the fifth thin-film transistor, the source of the ninth thin-film transistor is fed with a constant low voltage level signal, and the drain of the ninth thin-film transistor is connected to the second node.

4. The driving circuit according to claim 1, wherein the first voltage stabilizing module comprises a tenth thin-film transistor, a gate of the tenth thin-film transistor is fed with a constant high voltage level signal, and a source of the tenth thin-film transistor is connected to the first node.

5. The driving circuit according to claim 4, wherein the output control module comprises a twelfth thin-film transistor, the gate of the twelfth thin-film transistor is connected to a drain of the tenth thin-film transistor, and the source of the twelfth thin-film transistor is fed with a first staged clock signal.

6. A display panel, comprising a driving circuit, in which the driving unit comprises a plurality of cascaded driving units, where a first staged driving unit comprises:

a forward and backward scan control module, configured to enable the driving circuit to perform forward scanning or backward scanning based on a forward scan control signal or a backward scan control signal;

a node signal control module, configured to enable the driving circuit to output a gate driving signal at an abnormal stage based on a clock signal of a second staged driving unit and-the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end of the first staged driving unit based on a control signal provided by the node signal control module; and an electrical leakage control module, connected to the forward and backward scan control module, the first pull-down module and the second pull-down module, configured to maintain the voltage level of the output signal of the forward and backward scan control module,.

wherein the forward and backward scan control module comprises a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit, wherein the node signal control module comprises a sixth thin-film transistor, a seventh thin-film transistor and an eleventh thin-film transistor, wherein the gate of the sixth thin-film transistor is connected to the source of the fourth thin-film transistor, the source of the sixth thin-film transistor is fed with a second staged clock signal, the drain of the sixth thin-film transistor is connected to the drain of the seventh thin-film transistor and the gate of the eleventh thin-film transistor, wherein the gate of the seventh thin-film transistor is connected to the source of the fifth thin-film transistor, the source of the seventh thin-film transistor is fed with a third staged clock signal, and wherein the source of the eleventh thin-film transistor is fed with a constant high voltage level signal and the drain of the eleventh thin-film transistor is connected to the second node.

7. The display panel according to claim 6, wherein the electrical leakage control module comprises a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and the source of the third thin-film transistor is fed with the constant low voltage level signal.

8. The display panel according to claim 6, wherein the first pull-down module comprises a ninth thin-film transistor, the gate of the ninth thin-film transistor is connected to the drain of the fifth thin-film transistor, the source of the ninth thin-film transistor is fed with a constant low voltage level signal, and the drain of the ninth thin-film transistor is connected to the second node.

9. The display panel according to claim 6, wherein the first voltage stabilizing module comprises a tenth thin-film transistor, a gate of the tenth thin-film transistor is fed with a constant high voltage level signal, and a source of the tenth thin-film transistor is connected to the first node.

10. The display panel according to claim 9, wherein the output control module comprises a twelfth thin-film transistor, the gate of the twelfth thin-film transistor is connected to a drain of the tenth thin-film transistor, and the source of the twelfth thin-film transistor is fed with a first staged clock signal.

11. A display device, comprising a display panel, in which the display panel comprises a driving circuit and the driving unit comprises a plurality of cascaded driving units, where a first staged driving unit comprises:

a forward and backward scan control module, configured to enable the driving circuit to perform forward scanning or backward scanning based on a forward scan control signal or a backward scan control signal;

a node signal control module, configured to enable the driving circuit to output a gate driving signal at an abnormal stage based on a clock signal of a second staged driving unit and the clock signal of a third staged driving unit, wherein a voltage level of the gate driving signal outputted by the driving circuit is less than a predetermined voltage level, the second staged driving unit is a driving unit of a preceding stage with respect to the first staged driving unit, and the third staged driving unit is a driving unit of a next stage with respect to the first staged driving unit;

an output control module, located between a first node and an output end of the first staged driving unit, configured to control outputting a first staged gate driving signal during the forward scanning or the backward scanning performed by the driving circuit, wherein the first node is a node of the output end of the forward and backward scan control module;

a first voltage stabilizing module, connected to the forward and backward scan control module and the output control module, configured to maintain the voltage level of an output signal of the forward and backward scan control module;

a first pull-down module, configured to pull down the voltage level of a second node;

a second pull-down module, configured to pull down a voltage at the first node and the voltage at the output end based on a control signal provided by the node signal control module; and an electrical leakage control module, connected to the forward and backward scan control module, the first pull-down module and the second pull-down module, configured to maintain the voltage level of the output signal of the forward and backward scan control module, wherein the forward and backward scan control module comprises a fourth thin-film transistor and a fifth thin-film transistor, wherein a source of the fourth thin-film transistor is fed with the forward scan control signal, a gate of the fourth thin-film transistor is connected to the gate driving signal of a fourth staged driving unit, wherein a drain of the fourth thin-film transistor is connected to the drain of the fifth thin-film transistor, the first pull-down module and the first node, wherein the source of the fifth thin-film transistor is fed with the backward scan control signal, the gate of the fifth thin-film transistor is fed with the gate driving signal of a fifth staged driving unit, the fourth staged driving unit is a driving unit of a preceding stage with respect to the third staged driving unit, and the fifth staged driving unit is a driving unit of a next stage with respect to the second staged driving unit, wherein the node signal control module comprises a sixth thin-film transistor, a seventh thin-film transistor and an eleventh thin-film transistor, wherein the gate of the sixth thin-film transistor is connected to the source of the fourth thin-film transistor, the source of the sixth thin-film transistor is fed with a second staged clock signal, the drain of the sixth thin-film transistor is connected to the drain of the seventh thin-film transistor and the gate of the eleventh thin-film transistor, wherein the gate of the seventh thin-film transistor is connected to the source of the fifth thin-film transistor, the source of the seventh thin-film transistor is fed with a third staged clock signal, and wherein the source of the eleventh thin-film transistor is fed with a constant high voltage level signal and the drain of the eleventh thin-film transistor is connected to the second node.

12. The display device according to claim 11, wherein the electrical leakage control module comprises a first thin-film transistor, a second third thin-film transistor and a third thin-film transistor, wherein a gate of the first thin-film transistor is connected to the first node, a source of the first thin-film transistor is fed with a constant high voltage level signal, and a drain of the first thin-film transistor is connected to the drain of the second thin-film transistor and the drain of the third thin-film transistor, and the gate of the second thin-film transistor is fed with a constant low voltage level signal, the source of the second thin-film transistor is connected to the first node, the gate of the third thin-film transistor is connected to the second node, and the source of the third thin-film transistor is fed with the constant low voltage level signal.

* * * * *